United States Patent
Finn et al.

(10) Patent No.: US 8,040,897 B2
(45) Date of Patent: Oct. 18, 2011

(54) MULTIPLE SPANNING TREE EXTENSIONS FOR TRUNK PORTS CARRYING MORE THAN 4K VIRTUAL SERVICES

(75) Inventors: Norman W. Finn, Livermore, CA (US); Munish Mehta, Fremont, CA (US); Yibin Yang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 75 days.

(21) Appl. No.: 12/394,297

(22) Filed: Feb. 27, 2009

(65) Prior Publication Data

US 2010/0220737 A1    Sep. 2, 2010

(51) Int. Cl.
 *H04L 12/28* (2006.01)
(52) U.S. Cl. .................... 370/395.31; 370/401
(58) Field of Classification Search .......... None
 See application file for complete search history.

(56) References Cited

U.S. PATENT DOCUMENTS

| | | |
|---|---|---|
| 7,180,899 B2 | 2/2007 | De Silva et al. |
| 7,292,581 B2 | 11/2007 | Finn |
| 7,480,258 B1 | 1/2009 | Shuen et al. |
| 2004/0081171 A1* | 4/2004 | Finn .................... 370/395.53 |
| 2006/0007939 A1* | 1/2006 | Elangovan .............. 370/395.53 |
| 2006/0198323 A1 | 9/2006 | Finn |
| 2006/0245436 A1 | 11/2006 | Sajassi |
| 2007/0110078 A1* | 5/2007 | De Silva et al. ......... 370/395.53 |
| 2007/0147393 A1* | 6/2007 | Wu et al. .................. 370/395.53 |
| 2007/0258390 A1* | 11/2007 | Khan et al. ................ 370/256 |

* cited by examiner

*Primary Examiner* — Hassan Phillips
*Assistant Examiner* — Eunsook Choi
(74) *Attorney, Agent, or Firm* — Cesari and McKenna, LLP (57) ABSTRACT

In one embodiment, bridges in a computer network maintain a per-port mapping table for each of its ports, where each mapping table maps, for each virtual connection (of more than 4K) at a respective port, i) frame encapsulation fields that uniquely identify a particular virtual connection at the respective port to ii) a particular multiple spanning tree (MST) instance. The bridges may then compute a checksum of a particular mapping table for a particular port, and share the checksum with a corresponding port interconnected with the particular port (e.g., of another bridge). Upon determining that the mapping tables at the corresponding ports match in response to the checksums matching, frames may then be forwarded between the ports based on the particular mapping table.

20 Claims, 5 Drawing Sheets

MULTIPLE SPANNING TREE EXTENSIONS FOR TRUNK PORTS CARRYING MORE THAN 4K VIRTUAL SERVICES

TECHNICAL FIELD

The present disclosure relates generally to computer networks, and, more particularly, to Multiple Spanning Tree Protocols (MSTPs).

BACKGROUND

Virtual Local Area Networks (VLANs) have long been used as both an identifier of a service/traffic as well as a Broadcast Domain for flooding in Ethernet networks. Generally, VLAN identifiers (VIDs) have been limited to 4K (4096) unique numbers, although due to the increased demands of current networks, recent standards (e.g., IEEE 802.1ah) provides for greater scalability of service-identifiers (and MAC-tables,) while continuing to use traditional bridging techniques. For instance, one way the scalability problem has been addressed is by identifying a service using stacked VLAN tags and hence providing a 24-bit (12+12) identifier, or up to 16M unique numbers. The bridging of traffic in this scenario is thus performed by mapping the service identifier to a "bridge-domain" object on a given bridge, where MAC learning is performed on this "bridge-domain" and the VLAN tags are simply treated as encapsulation information. This scheme of using VLAN tags as a service identifier is contrary to the conventional meaning of a VLAN as a broadcast-domain in the layer-2 (L2) network.

In addition, redundancy links may be used for high availability reasons, and the redundant links generally benefit from loop-prevention protocols. The Multiple Spanning Tree (MST) Protocol (or MSTP) is widely used in L2 networks for loop prevention, however, MST protocol today assumes that VLANs are used as a service identifier with a network wide scope. That is, MSTP assumes that VLAN encapsulation is the same throughout the entire network, where service identifiers are typically a trunk-based identification. As such, MSTP does not directly apply to an L2 network with trunks carrying more than 4K services using double-stacked VLAN tags (or other encapsulation fields).

BRIEF DESCRIPTION OF THE DRAWINGS

The advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, bridges in a computer network maintain a per-port mapping table for each of its ports, where each mapping table maps, for each virtual connection (of more than 4K) at a respective port, i) frame encapsulation fields that uniquely identify a particular virtual connection at the respective port to ii) a particular multiple spanning tree (MST) instance. The bridges may then compute a checksum of a particular mapping table for a particular port, and share the checksum with a corresponding port interconnected with the particular port (e.g., of another bridge). Upon determining that the mapping tables at the corresponding ports match in response to the checksums matching, frames may then be forwarded between the ports based on the particular mapping table.

Description

A computer network typically comprises a plurality of interconnected entities. An entity may consist of any network device, such as a server or end station, that "sources" (i.e., transmits) or "sinks" (i.e., receives) data frames. A common type of computer network is a local area network ("LAN"), which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack).

One or more intermediate network devices are often used to couple LANs together and allow the corresponding entities to exchange information. For example, a bridge (or switch) may be used to provide a "bridging" (or "switching") function between two or more LANs. Typically, the bridge is a computer and includes a plurality of ports that are coupled to the LANs (also called "links"). Ports that are coupled to LANs that are, in turn, coupled to other bridges are generally referred to as a trunk ports, whereas ports used to couple bridges through LANs to end stations are generally referred to as access ports. The bridging function includes receiving data from a sending entity at a source port and transferring that data to at least one destination port for forwarding to a receiving entity.

Although bridges may operate at various levels of the communication protocol stack, they typically operate at Layer-2, which, in the OSI Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to which the message is being sent, referred to as the destination address. To perform the bridging function, Layer-2 bridges examine the MAC destination address of each data frame received on a source port. The frame is then switched onto the destination port(s) associated with that MAC destination address.

Other devices, commonly referred to as routers, may operate at higher communication layers, such as Layer-3 of the OSI Reference Model, which in Transmission Control Protocol/Internet Protocol (TCP/IP) networks corresponds to the Internet Protocol (IP) layer. Packets at the IP layer also include a header, which contains an IP source address and an IP destination address. Routers or Layer-3 switches may re-assemble or convert received data frames from one LAN standard (e.g., Ethernet) to another (e.g. token ring). Thus, Layer-3 devices are often used to interconnect dissimilar subnetworks.

Figure 1:
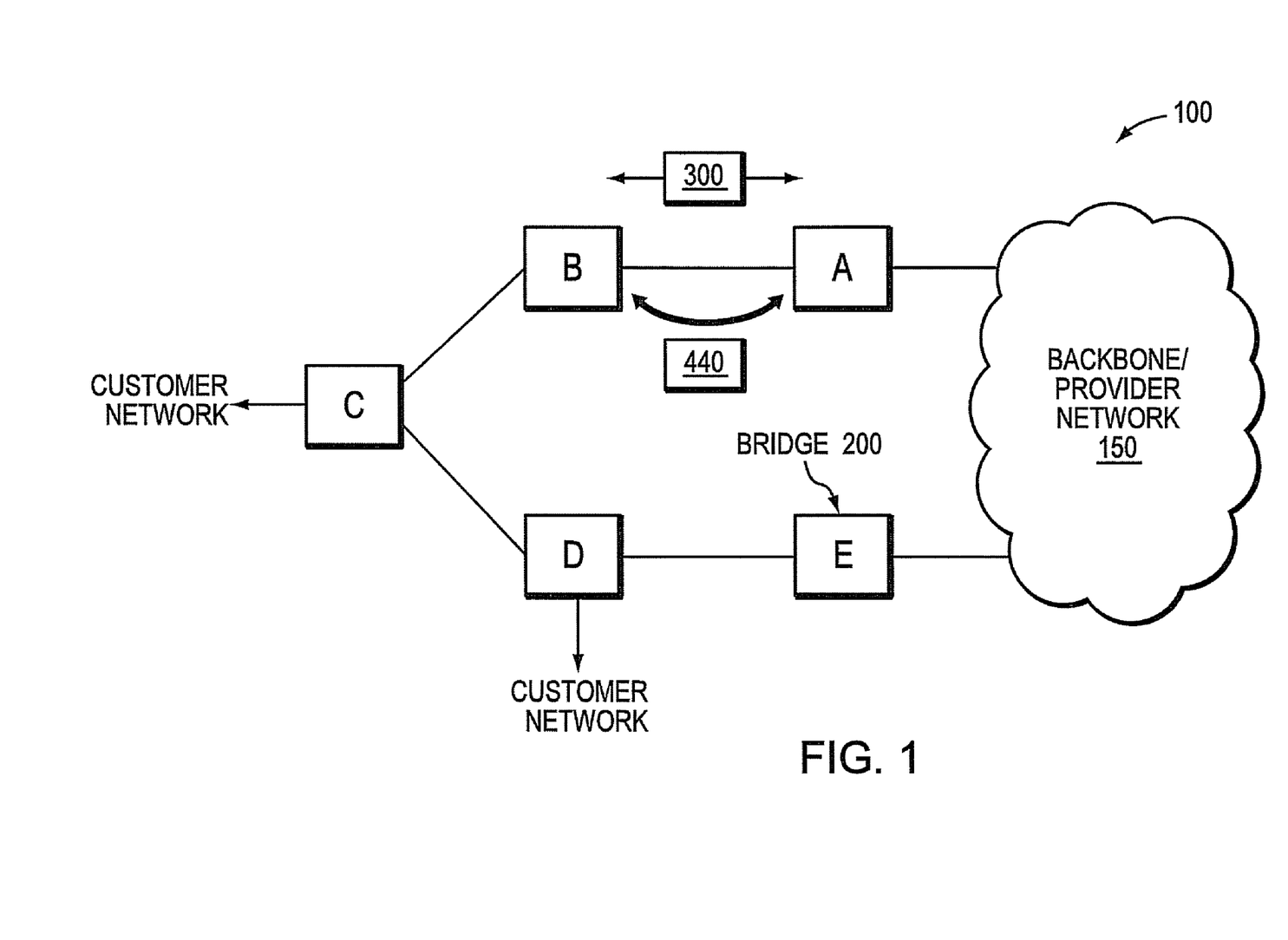
FIG. 1 illustrates an example computer network (e.g., a bridged network)

FIG. 1 is a schematic block diagram of an example computer network 100 illustratively comprising nodes/devices, such as bridges 200A-E interconnected by links as shown. In particular, bridges 200C and 200D (or, simply bridges "C" and "D") are interconnected with a customer network, while bridges A and E have gateway ports interconnected with a provider network 150 (e.g., an IEEE 802.1ah or MPLS backbone network, as will be understood by those skilled in the art). Illustratively, bridges A-E form an aggregation network (e.g., IEEE 802.1ad).

Since network 100 comprises bridges, and illustratively operates according to Layer-2, the network 100 may be referred to herein as a "bridged network" accordingly. Those skilled in the art will understand that any number of nodes, devices, links, etc. may be used in the computer network, and that the view shown herein is for simplicity. For example, while the network 100 of bridges is shown as a simple segment of a small number of bridges, the embodiments described herein may also be applicable to "chains" or "rings" of bridges, e.g., large numbers of bridges. Those skilled in the art will also understand that while the embodiments described herein are described generally, they may apply to any network. The computer (bridged) network 100 of FIG. 1 is meant for illustration purposes only and is not meant to limit the embodiments described herein.

Figure 2:
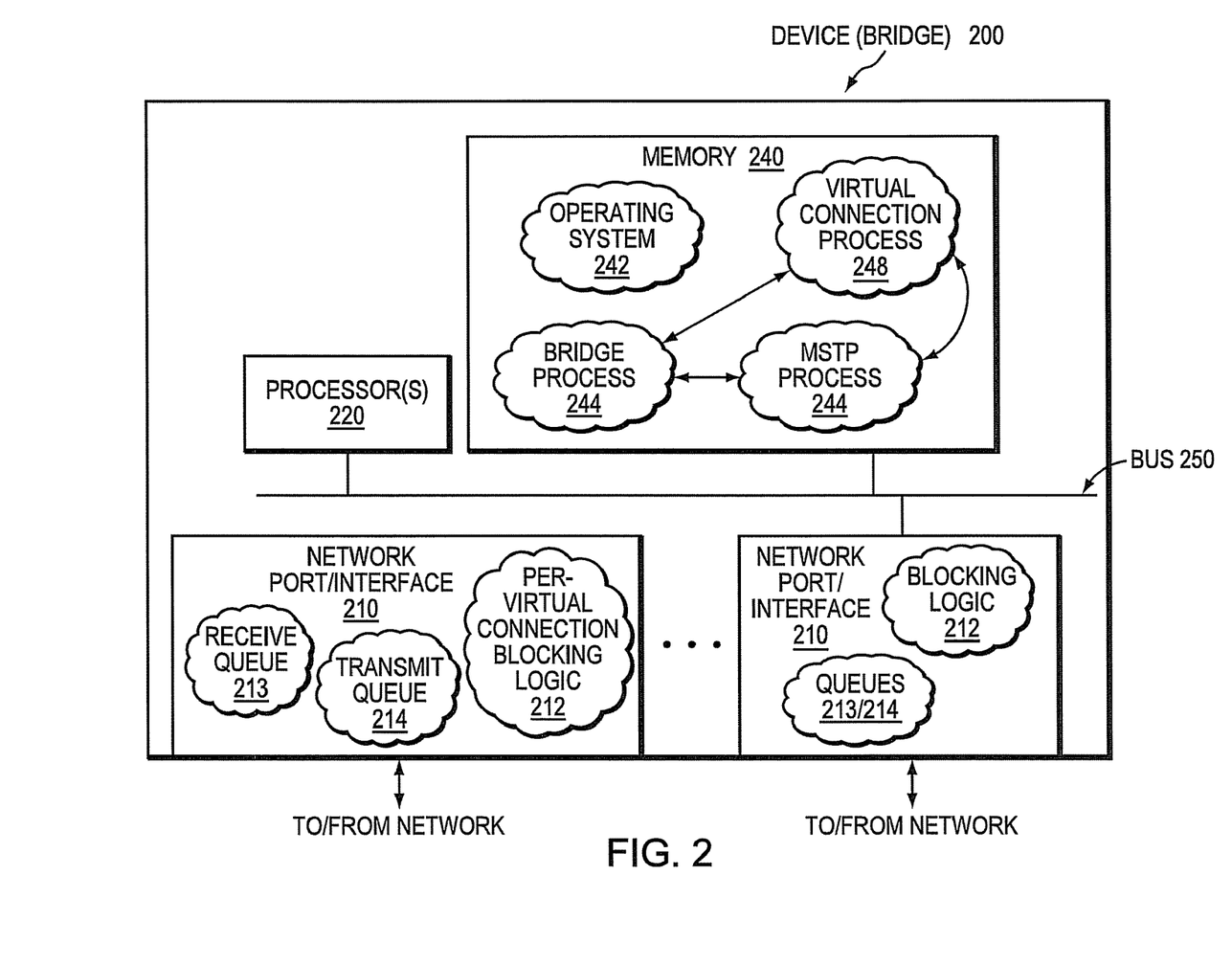
FIG. 2 illustrates an example network device/node (e.g., bridge)

FIG. 2 is a schematic block diagram of an example node/device 200 that may be advantageously used with one or more embodiments described herein, e.g., as a bridge. The device comprises a plurality of network interfaces or ports 210, one or more processors 220, and a memory 240 interconnected by a system bus 250. The network interfaces/ports 210 contain the mechanical, electrical, and signaling circuitry for communicating data over physical links coupled to the network 100, particularly on Layer-2. The network interfaces/ports may be configured to transmit and/or receive data (frames) using a variety of different communication protocols over physical links or wireless links, for instance with the use of queues (receive queue 213 and transmit queue 214) as will be understood by those skilled in the art. For example, such communication protocols may include, inter alia, TCP/IP, UDP, ATM, synchronous optical networks (SONET), wireless protocols (e.g., IEEE Std. 802.11), Frame Relay, Ethernet (e.g., IEEE Std. 802.3), Fiber Distributed Data Interface (FDDI), etc. Notably, a network interface/port 210 may also be used to implement one or more virtual network interfaces, such as for Virtual Private Network (VPN) access or Virtual LANs (VLANs), as will be understood by those skilled in the art. Illustratively, the handling of frames within the network interfaces/ports 210 may conform to a protocol stack (not shown) that defines the functions performed by the data link and physical layers of a communications architecture. Further, as described herein, each port may be enabled with per-virtual-circuit blocking logic/circuitry 212.

The memory 240 comprises a plurality of storage locations that are addressable by the processor(s) 220 and the network interfaces/ports 210 for storing software programs and data structures associated with the embodiments described herein. The processors 220 may comprise necessary elements or logic adapted to execute the software programs and manipulate the data structures, such as per-port mapping tables 400, described below. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise an illustratively simplified "bridge process" 244, along with an illustrative multiple spanning tree protocol (MSTP) process 246 and a virtual connection process 248, as described herein.

It will be apparent to those skilled in the art that other types of processors and memory, including various computer-readable media, may be used to store and execute program instructions pertaining to the inventive technique described herein.

Bridge process 244 contains computer executable instructions executed by the processor(s) 220 to perform various functions relating to bridges in general, as may be appreciated by those skilled in the art. For instance, a communication process/service of bridge process 244 may perform functions provided by one or more communication protocols, such as various switching/bridging protocols. These functions may be configured to manage switching databases (e.g., spanning tree instances), filtering databases (FDBs), or forwarding information databases (FIBs) containing, e.g., data used to make switching/forwarding decisions. In particular, as part of communication process/services, a spanning tree process may execute to perform functions provided by one or more spanning tree protocols (STPs), such as the known Multiple STP (MSTP) through sub-process 246, in addition to the novel techniques described herein. Illustratively, MSTP may be employed on the network devices (bridges) to establish and maintain one or more spanning tree instances, converging the network in response to topology changes.

As noted above, with service providers adopting Ethernet as a medium of choice, the Ethernet switching technology is increasingly becoming ubiquitous in Metro Networks. VLANs have long been used as both an identifier of the service/traffic as well as a Broadcast Domain for flooding in the Ethernet networks. With VLAN ID range limited to 4K unique identifiers, its use as a service identifier does not scale enough in the Metro Ethernet networks for deploying a large number of Ethernet services. Recent standards (e.g., IEEE 802.1ah) define new Ethernet technologies and frame formats, which provide scalability of service-identifiers and MAC-tables, while continuing to use traditional Ethernet bridging techniques.

Many of the existing service provider deployments have tried to solve the VLAN identifier (VID) scalability problem by identifying a service using stacked VLAN tags and hence providing a (12+12) or 24-bit identifier. In addition, many service providers identify the service using mix of VLAN tags and Class of Service (CoS) information in the frame. The bridging of traffic in this case is carried out by mapping the service identifier to a "bridge-domain" object on a given bridge/switch. As such, MAC learning is performed on this "bridge-domain" and the VLAN tags are simply treated as encapsulation information. This scheme of using VLAN tags as a service identifier takes away the meaning of a VLAN as a broadcast-domain in the L2 network, and hence each bridge/switch in the L2 network are configured with "bridge-domain" objects. The trunks interconnecting such bridges are still IEEE 802.1Q (or 802.1ad) trunks, but they are carrying more than 4K services or Broadcast Domains.

In such a network, redundancy links are also often utilized for high availability reasons. The redundant links in an L2 network lead to the need for loop-prevention protocols, such as MSTP. However, MSTP currently assumes that VLANs are used as a service identifier with a network-wide scope, and hence does not directly apply to an L2 network with trunks carrying more than 4K services using double-stacked VLAN tags, or mix of VLAN, CoS and other encapsulation fields supporting more than 4K services. The embodiments described herein, therefore, provide an enhanced way to support MSTP as a loop prevention mechanism, by allowing the mapping of a plurality of service-identifiers to an MST instance, and hence extending MSTP to work at the granularity of virtual services/connections (e.g., Ethernet Virtual Connections or "EVCs") rather than simply VLANs, and to function with more than 4K virtual services on a single port (not simply per-bridge).

MST Extensions for >4K Virtual Services

Figure 3:
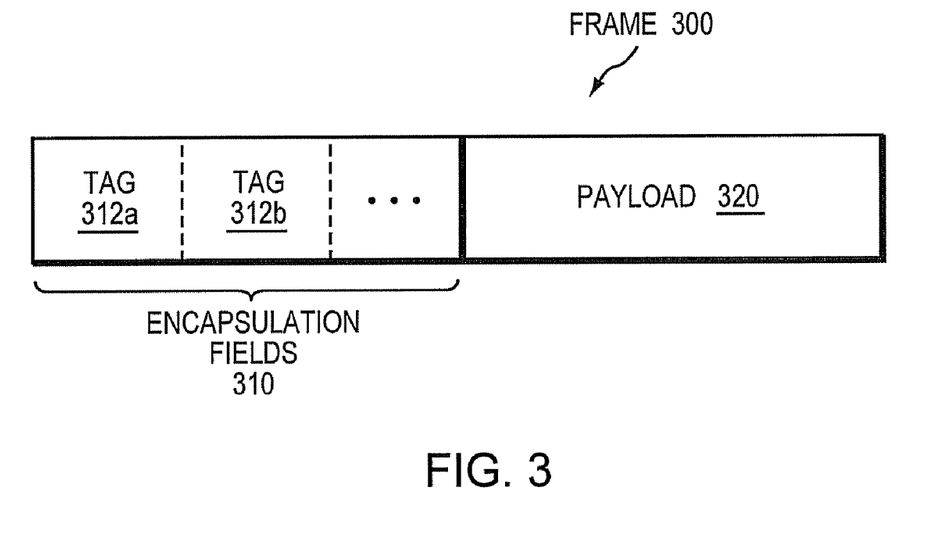
FIG. 3 illustrates an example frame format.

According to embodiments of the disclosure, EVC virtual services, which generally are identified by a string, are now identified by a numerical identification (e.g., an "EVC number"), which may be distributed throughout the network using various known protocols, such as VTP (or VTP3). Illustratively, the EVC number may be a "double-tagged" identifier (two 12-bit identifier fields, e.g., IEEE 802.1Q) or a single identifier (e.g., a 14-bit or 24-bit identifier, such as IEEE 802.1ah), so long as the capability exists to uniquely identify more than 4K (4096) services (e.g., up to 16 million). For example, FIG. 3 illustrates an example frame 300 showing encapsulation fields 310 (e.g., two virtual connection tags 312a/b) and a payload 320, as will be appreciated by those skilled in the art.

Specifically, MST protocol extensions described herein comprises MST configuration checksum over a table, where each entry is a mapping of virtual service (e.g., EVC) identifier fields to an MST instance. In addition, the MST configuration checksum calculation is local to a particular port, which allows different connections between two bridges to have the ability to carry separate sets of virtual services (e.g., EVCs), while providing ability to share same/similar encapsulation fields. (For example, as described below, four separate links between two bridges can provide redundant paths to carry two separate sets of EVC services between the bridges, with each one mapping to a different MST instance.) As such, the techniques described below also provide for a per-port, per-virtual-service (per-EVC) blocking logic, where virtual services are given an updated state equal to that of its corresponding MST instance.

Illustratively, the techniques described herein may be performed by hardware, software, and/or firmware, such as in accordance with a virtual connection process 248, in conjunction with MSTP process 246 and bridging process 244. For instance, these processes may incorporate various registration protocol processes as described herein, and may operate in accordance with certain conventional protocols (e.g., MSTP, etc.) and in accordance with the techniques described herein (e.g., enhancements to the protocols).

As mentioned above, MSTP is widely used for loop prevention and is an IEEE standard for current Ethernet networks. It supports creation of multiple topologies each having its own instance, and allows mapping VLANs to an instance where all VLANs mapped to the same instance share the same instance topology. Those skilled in the art are aware that MSTP also only transmits control frames (BPDUs) on a per-physical-link basis rather than a per-VLAN basis, and carries information about all the VLANs carried over a link in the control frame. In order for MSTP to work correctly, the VLAN-to-MST-instance mapping in two bridges across a link needs to be exchanged in order to determine whether the two mappings match. That is, as long as this mapping is same across the link (i.e., at both ports on either end of the link), both the bridges and the link are considered to be part of the same MST region/instance. If there is a mapping mismatch, the two bridges are considered to be in separate MST region, and hence use a Common Instance Spanning Tree (e.g., instance "0"), where all the benefits of load-balancing on a per-instance basis are lost.

Servicer provider customers have requested that the same benefits of MSTP with per-instance load-balancing be applied to virtual services/connections (e.g., EVCs). That is, instead of mapping a VLAN or set of VLANs to an instance (defining the topology), the customers want to load-balance their EVCs (or bridge domains, "BDs") across different MST instances. Since each EVC is recognized by a unique EVC ID (string) across the network that is assigned by configuration, it is quite intuitive to think that the EVC ID could be used to replace VLAN ID (VID) in the conventional VLAN-to-instance mapping table. With this method, as long as the EVC ID-to-instance mapping is consistent across two ends of a physical link, both the bridges at each end can be considered to be part of the same MST region. Using this approach, MSTP can load-balance EVC traffic across different network links as controlled by per-instance topology. However, the above approach has a critical flaw, where in the event of any misconfiguration in the EVC configuration, traffic leaking may occur from one bridge-domain to other.

For example, consider two instances of two virtual connections (EVCs) at each end of a physical link (e.g., between bridge A and bridge B of FIG. 1):

EVC instances on Interface 1 of Bridge-A
    MSTP service instance 1="EVC_Foo"
        encapsulation=20|300 (inner|outer)
        bridge-domain=100
    MSTP service instance 2="EVC_Bar"
        encapsulation=30|300
        bridge-domain=200
EVC instances on Interface 2 of Bridge-B
    MSTP service instance 1="EVC_Foo"
        encapsulation=30|300
        bridge-domain=100
    MSTP service instance 2="EVC_Bar"
        encapsulation=20|300
        bridge-domain=200

The above configuration will lead to consistent EVC ID-to-instance matching on both sides of the link (Instance 1=EVC_Foo, Instance 2=EVC_Bar), but due to the misconfiguration of encapsulation fields above (the inner tags 20/30 are transposed), the EVC_Foo traffic of Bridge-A will be switched to EVC_Bar traffic on Bridge-B and vice-versa, which potentially can lead to bridging-loops.

Figure 4:
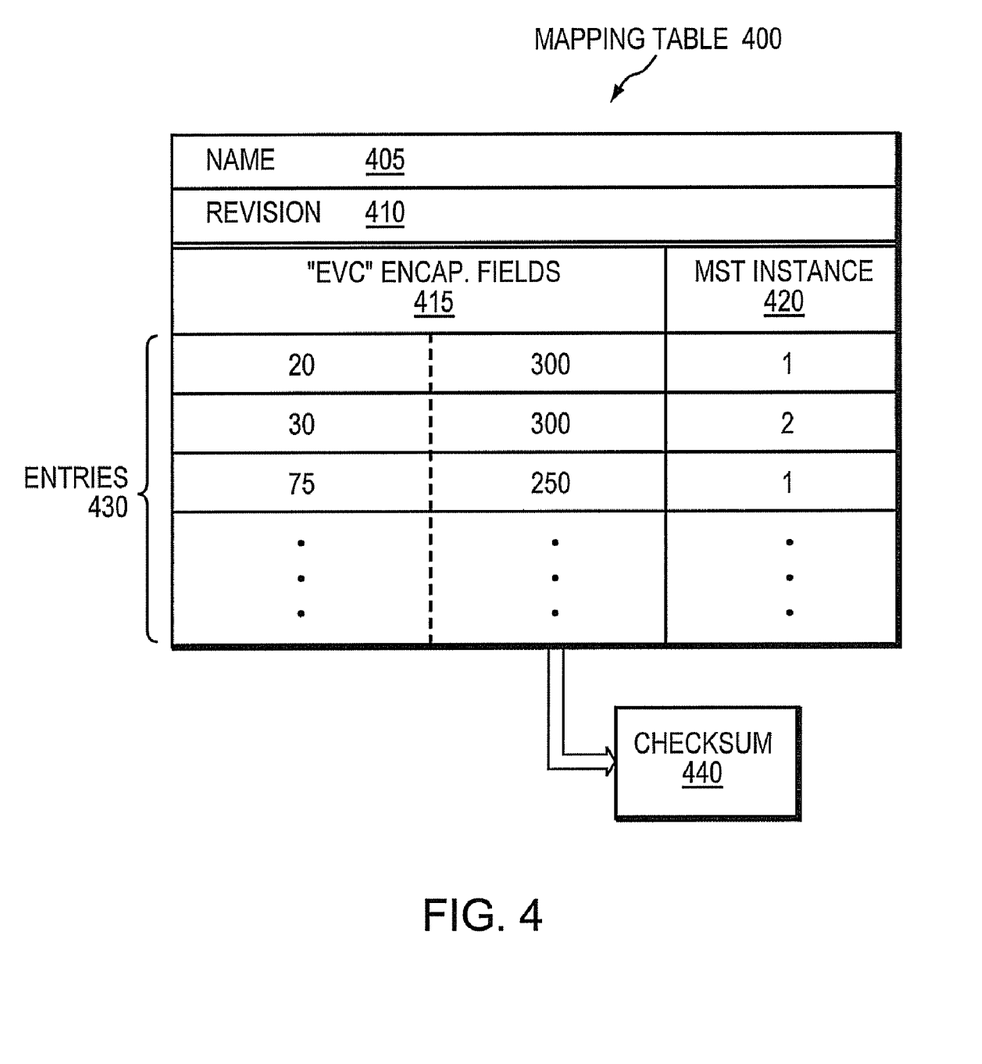
FIG. 4 illustrates an example mapping table.

Since its clear that the VLAN ID-to-instance mapping scheme cannot be simply extended to support EVCs with MSTP, the embodiments described herein propose a more generic scheme to extend MSTP to work with complex traffic identifiers, particularly for virtual connections (EVCs). In particular, according to the novel techniques described herein, each bridge 200 in the network maintains a per-port mapping table 400 that consists of mapping all the frame encapsulation fields used to identify a virtual connection (e.g., bridge-domain or an EVC) to a corresponding MST instance. This per-port mapping table will contain one mapping for each virtual connection passing through the physical link.

FIG. 4 illustrates an example mapping table 400 in accordance with one or more embodiments described herein. (Those skilled in the art will appreciate that while a particular format is shown, other table formats and/or other techniques for organizing mapping data may be used, and the table shown is merely a representative example.) Table 400 may have a name 405, a revision number 410, and a plurality of entries 430 comprising fields for virtual connection frame encapsulation fields 415 and MST instances 420. As stated, each bridge maintains a mapping table 400 for each port of a bridge (e.g., in main memory 240 as shown or at each port 210). For each virtual connection at a respective port, the mapping table maps all frame encapsulation fields 415 that uniquely identify a particular virtual connection at the respective port to a particular MST instance 420. For example, if a double-tagged frame (12+12 or 24-bit ID) is used to identify "EVC_Foo" and subsequently that EVC_Foo is mapped to an instance, the mapping table on that port will have an entry 430 corresponding to the frame encapsulation fields 415 for EVC_ Foo (e.g., "20|300" or other ID, e.g., a single 24-bit tag) and a mapping to MST instance 1 (i.e., whenever the EVC_Foo is mapped to MST Instance 1).

This extended mapping table (extended as compared to a conventional VLAN mapping table using only outer VLAN tags) ensures that the EVCs (and bridge-domains) are consistently defined across two ends of a link in an MST region, and hence there is no leaking of one bridging service (EVC_Foo) to another bridging service (EVC_Bar) in the network. In particular, since the mappings are local to the bridges (more specifically, to a port), a mechanism is needed to check if the neighboring bridges have a consistent configuration so that the same MST instance is used for a virtual connection (e.g., EVC) within an MST region.

A straightforward solution is to perform a checksum or hash (e.g., using the known MD5 algorithm) of the mapping tables 400 on either side of a link, and to share and compare these checksums. In particular, a checksum is useful as the mapping table may be generally large in nature (e.g., 8K bytes), while the checksum itself may be merely 50 bytes, a vast bandwidth savings during transfer. However, unlike the conventional checksum computation of mapping tables (as will be understood by those skilled in the art), the checksum cannot merely be computed based on outer tags. Consider again the simple example above, where the inner tags are transposed (or otherwise different). The conventional VLAN-to-instance checksum using outer tags only could not detect this mismatch (as the outer tags match), and a loop could occur (or other problematic outcome) as the traffic is switched from one MST instance to another.

According to the techniques described herein, then, the checksum computation may be performed over the entire table that maps all encapsulation parameters to MST instances (resulting in checksum 440). That is, considering the use of doubled-tagged frames 300 as the most common scenario, the entire range of EVC numbers using a 24-bit space could be pre-mapped to certain MST instances based on the topology requirements. The MST configuration checksum may then be computed on both ends of a link. The checksum is computed based on the actual frame encapsulation parameters (tags) that are being used on the link (i.e., the virtual connection's representation on wire). As such, each port's mapping table 400 will have a different checksum.

The checksums 440 may be shared with correspondingly interconnected ports, which may then determine whether the mapping tables match in response to whether the checksums match. In other words, if the checksums 440 match at both ends of the link (optionally, as well as the name 405 and revision number 410 of the table), then frames 300 may be confidently forwarded between the ports based on the mapping table 400. In the above misconfiguration example, the tables would be different for bridge A and B and thus the checksum/hash 440 would be different. In this case, where the checksums do not match, bridge A and B may be considered as region boundaries for the MST instance, and may thus follow an MST common instance topology (e.g., MST instance "0"). (The erroneous configuration detection may be left for management protocols such as Connectivity Fault Management or "CFM" to handle, or other manual reconfiguration.)

Notably, though the techniques described above are able to achieve loop prevention, the cost of computation may be high in the event of complex frame encapsulation fields and additional encapsulation parameters (e.g., Class of Service or "CoS" indicators). One solution is to restrict the mappings so that the checksum computation could be simplified. For example, for any port on a bridge whose mapping utilizes only a portion of the frame encapsulation fields (e.g., only an outer tag), or states the mapping algorithmically (e.g., even/odd, the lowest "x" bits, the first "n" values, etc.), the virtual connections having an indistinguishable identification based on that portion (or algorithmic similarity) may be required to map to a same MST instance in the mapping table. (Note that this restriction does not prevent two EVCs with the shared portion on two separate ports from being mapped into two different MST instances.)

Further, according to the embodiments described herein, in order to support a spanning-tree protocol on the virtual service/connection (EVC) traffic, a granular approach to support spanning-tree states on a per-port per-virtual-service basis is needed. Accordingly, per-virtual-connection blocking logic 212 (e.g., hardware) may be utilized on bridge ports 210 (also referred to as EVC blocking logic or "EBL"). When a frame is to be transmitted on a virtual connection, the frame may be flooded only the virtual connections having active ports. In particular, when MSTP sets the state of an instance (topology), all the virtual connections that are mapped to that instance have their state set to the corresponding MSTP state (disabled, listening/blocking, learning, or forwarding).

Figure 5:
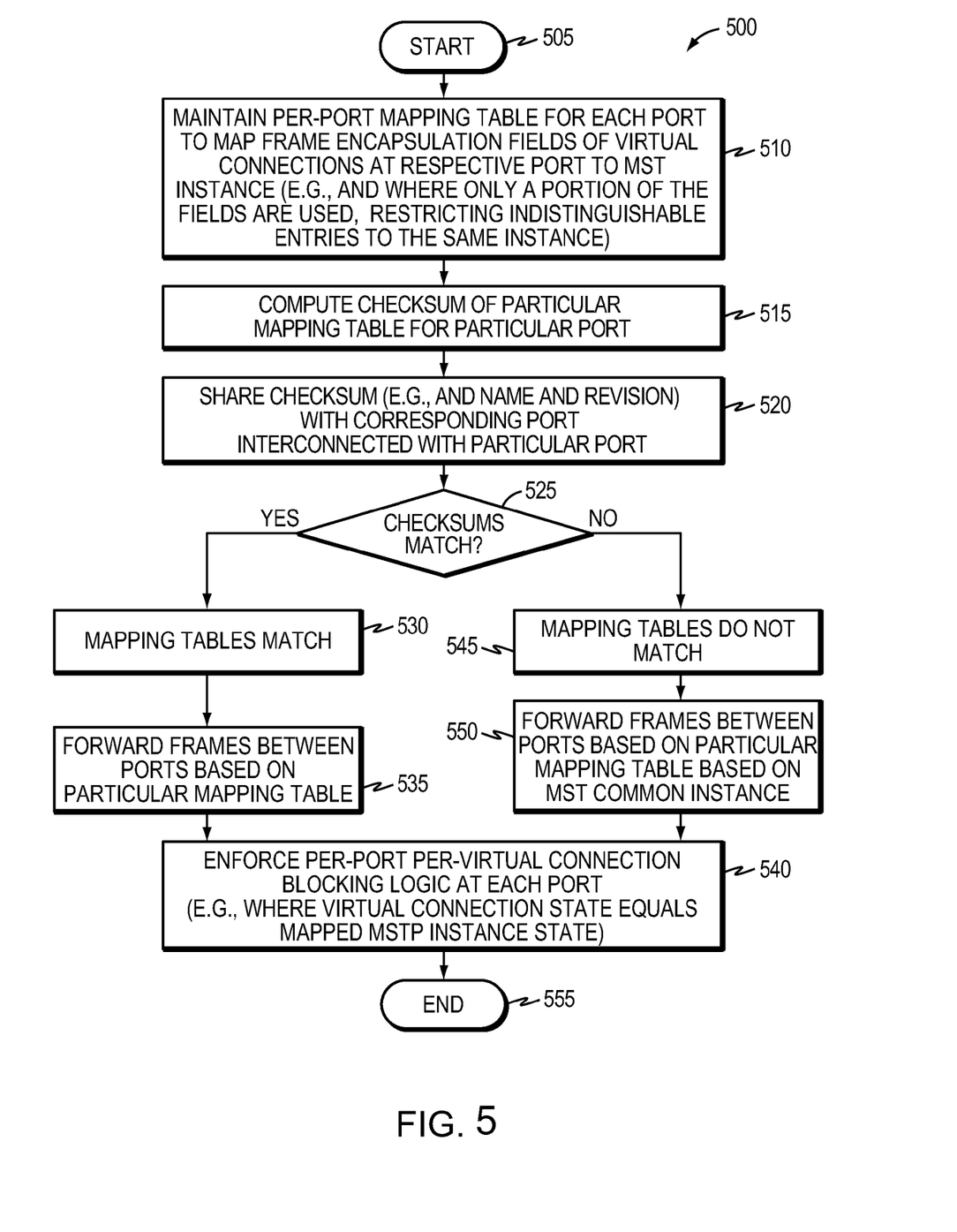
FIG. 5 illustrates an example procedure for allowing more than 4K virtual services through MST extensions.

FIG. 5 illustrates an example procedure for allowing more than 4K virtual services through MST extensions in accordance with one or more embodiments described herein. The procedure 500 starts at step 505, and continues to step 510, where per-port mapping tables 400 are maintained for each port of a bridge to map frame encapsulation fields of virtual connections at respective ports to MST instances. (Note that, as mentioned above, where only a portion of the fields are used, indistinguishable entries may be restricted to the same instance.)

As described in more detail above, in order to confirm that correspondingly interconnected ports are using the same mapping table, in step 515 the bridge may compute a checksum 440 of a particular mapping table 400 for particular port 210 (e.g., computing a checksum for each table of each port). The bridge may then share the checksum (e.g., and name and revision) with the corresponding interconnected port in step 520. If the checksums (e.g., and name and revision) match in step 525, then in step 530 it is assumed that the mapping tables match, and frames may be forwarded between the ports based on the matching mapping table in step 535. In this case, in step 540 the bridge may enforce per-port per-virtual connection blocking logic at each port, for example, such that the virtual connection state equals the correspondingly mapped MSTP instance state (forwarding, blocking/listening, etc.).

On the other hand, if in step 525 the shared checksums do not match, then in step 545 it may be determined that the mapping tables at the interconnected ports do not match, and illustratively, frames may be forwarded between those ports in step 550 using an MST common instance. As such, loops may be avoided between the ports, however at the cost of eliminating virtual services between the bridges until the problem is resolved. In step 555 the procedure 500 ends, notably with the option of repeatedly computing and sharing checksums to confirm proper traffic control, accordingly.

Advantageously, the novel techniques described herein provide for MST extensions to allow more than 4K virtual services in a computer network. By defining a generic scheme to extend MST, the novel techniques support networks (e.g., Carrier Ethernet) with virtual service (e.g., EVC) switching where each port is carrying more than 4K services. In particular, loop prevention is a common requirement as well as challenge in deploying virtual services (e.g., EVCs) in Carrier Ethernet networks, and the extensions to MST described above provide for loop prevention in an EVC-switched network. Further, the dynamic aspects of one or more embodiments described herein alleviate the need for cumbersome and inefficient manual configuration.

While there have been shown and described illustrative embodiments that efficiently prune virtual services in a bridged computer network, it is to be understood that various other adaptations and modifications may be made within the spirit and scope of the present invention. For example, the embodiments have been shown and described herein in relation to various protocols, such as MD5, MSTP, etc. However, the embodiments of the invention in their broader sense are not so limited, and may, in fact, be used with any suitable protocols. Moreover, while references to Ethernet networks are made, the techniques may be applied to any suitable computer network and under any suitable management scheme. In addition, while the embodiments described above share checksums 440 among ports of different bridges, it may be possible and beneficial in certain circumstances to interconnect two ports of a same bridge.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   maintaining a per-port mapping table for each port of a bridge, each mapping table mapping, for each virtual connection at a respective port, i) frame encapsulation fields that uniquely identify a particular virtual connection at the respective port to ii) a particular multiple spanning tree (MST) instance, the frame encapsulation fields comprising more bits than a single virtual local area network identifier (VLAN ID) that uniquely identify greater than 4096 virtual connections at the port;
   computing a checksum of a particular mapping table for a particular port;
   sharing the checksum with a corresponding port interconnected with the particular port;
   determining that mapping tables at the particular port and its corresponding port match in response to the checksums matching; and in response
   forwarding frames between the particular port and its corresponding port based on the particular mapping table.

2. The method as in claim 1, further comprising:
   determining that mapping tables at the particular port and its corresponding port do not match in response to the checksums not matching; and in response
   forwarding frames between the particular port and its corresponding port based on an MST common instance.

3. The method as in claim 1, further comprising:
   enforcing per-port per-virtual connection blocking logic at each port.

4. The method as in claim 3, further comprising:
   determining a first state of an MST instance on the particular port; and
   setting a second state of all virtual connections mapped to that MST instance as the first state.

5. The method as in claim 4, wherein the first state is selected from a group consisting of: disabled, listening/blocking, learning, and forwarding.

6. The method as in claim 1, wherein the frame encapsulation fields comprise double 12-bit tags.

7. The method as in claim 1, wherein the frame encapsulation fields comprise a single 24-bit tag.

8. The method as in claim 1, wherein the frame encapsulation fields comprises a Class of Service (CoS) indicator.

9. The method as in claim 1, wherein a virtual connection is one of either a bridge domain (BD) or an Ethernet Virtual Connection (EVC).

10. The method as in claim 1, wherein the particular port is of a first bridge, and the corresponding port is a port of a second bridge other than the first bridge.

11. The method as in claim 1, wherein computing the checksum comprises:
    utilizing an MD5 checksum computation algorithm.

12. The method as in claim 1, further comprising:
    sharing a name of the mapping table and a revision number of the mapping table with the corresponding port interconnected with the particular port;
    determining that mapping tables at the particular port and its corresponding port match in response to the checksums matching, the names matching, and the revision number matching.

13. A method comprising:
    maintaining a per-port mapping table for each port of a bridge, each mapping table mapping, for each virtual connection at a respective port, i) frame encapsulation fields that uniquely identify a particular virtual connection at the respective port to ii) a particular multiple spanning tree (MST) instance, the frame encapsulation fields able to uniquely identify greater than 4096 virtual connections at the port;
    restricting the mapping of all virtual connections having indistinguishable identification from the portion of the frame encapsulation fields to a same MST instance in the mapping table;
    computing a checksum of a particular mapping table for a particular port;
    sharing the checksum with a corresponding port interconnected with the particular port;
    determining that mapping tables at the particular port and its corresponding port match in response to the checksums matching; and in response
    forwarding frames between the particular port and its corresponding port based on the particular mapping table.

14. An apparatus, comprising:
    a plurality of network ports adapted to communicate frames in a computer network;
    a processor coupled to the network ports and adapted to execute one or more processes; and
    a memory configured to store a per-port mapping table for each port, each mapping table to map, for each virtual connection at a respective port, i) frame encapsulation fields that uniquely identify a particular virtual connection at the respective port to ii) a particular multiple spanning tree (MST) instance, the frame encapsulation fields comprising more bits than a single virtual local area network identifier (VLAN ID) that uniquely identify greater than 4096 virtual connections at the port;

the memory further configured to store a bridging process executable by the processor, the bridging process when executed operable to:
maintain the per-port mapping table for each port;
compute a checksum of a particular mapping table for a particular port;
share the checksum with a corresponding port interconnected with the particular port;
determine that mapping tables at the particular port and its corresponding port match in response to the checksums matching; and in response
forward frames between the particular port and its corresponding port based on the particular mapping table.

15. The apparatus as in claim 14, wherein the bridging process when executed is further operable to:
enforce per-port per-virtual connection blocking logic at each port.

16. The apparatus as in claim 15, wherein the bridging process when executed is further operable to:
determine a first state of an MST instance on the particular port; and
set a second state of all virtual connections mapped to that MST instance as the first state.

17. The apparatus as in claim 14, wherein the frame encapsulation fields comprise one of either double 12-bit tags or a single 24-bit tag.

18. The apparatus as in claim 14, wherein a virtual connection is one of either a bridge domain (BD) or an Ethernet Virtual Connection (EVC).

19. The apparatus as in claim 14, wherein the apparatus is a first bridge, and the corresponding port is a port of a second bridge other than the first bridge.

20. A system, comprising:
a first bridge in a computer network, the first bridge having a first port of a plurality of ports;
a second bridge in the computer network, the second bridge having a second port of the plurality of ports, the second port interconnected with the first port;
a per-port mapping table for each port of each bridge, each mapping table to map, for each virtual connection at a respective port, i) frame encapsulation fields that uniquely identify a particular virtual connection at the respective port to ii) a particular multiple spanning tree (MST) instance, the frame encapsulation fields comprising more bits than a single virtual local area network identifier (VLAN ID) that uniquely identify greater than 4096 virtual connections at the port;
wherein the first and second bridges are configured to:
compute a checksum of a particular mapping table for the respective first or second port;
share the checksum with the corresponding second or first port;
determine that mapping tables at the first and second ports match in response to the checksums matching; and in response
forward frames between the first and second port based on the particular mapping table.

\* \* \* \* \*